United States Patent [19]

Damico

[11] Patent Number: 4,607,893
[45] Date of Patent: Aug. 26, 1986

[54] MACHINE SLIDE BEARING ASSEMBLY

[75] Inventor: Frank M. Damico, Neenah, Wis.

[73] Assignee: Detroit Edge Tool Company, Detroit, Mich.

[21] Appl. No.: 690,677

[22] Filed: Jan. 11, 1985

[51] Int. Cl.[4] .................................. F16C 29/06
[52] U.S. Cl. ...................................... 384/45
[58] Field of Search ............. 308/3 R, 3 A, 6 R, 6 C; 384/255

[56] References Cited

U.S. PATENT DOCUMENTS

| | | | |
|---|---|---|---|
| 2,929,572 | 3/1960 | Baumgartner et al. | 384/255 X |
| 3,389,625 | 6/1968 | Wagner | 308/6 C X |
| 3,498,685 | 3/1970 | Poplinski | 308/3 R |
| 4,491,195 | 1/1985 | Mikkelsen et al. | 384/255 X |

Primary Examiner—Stuart S. Levy
Assistant Examiner—David Werner
Attorney, Agent, or Firm—Barnes Kisselle Raisch Choate Whittemore & Hulbert

[57] ABSTRACT

A machine with dovetail ways has a slide guided thereon by means of four sets of recirculating linear roller bearing cartridges, two sets of cartridges at each side of the slide engage the two ways. Each set of cartridges is mounted on a support bracket secured to the slide so that the roller bearings of one cartridge engage the upper horizontal face of the way and the roller bearings of the other cartridge engage the downwardly inclined face of the way. The cartridges for the bearings which engage the inclined face of the ways are rotatively supported on an eccentric shaft which enables the cartridges to be shifted toward and away from the inclined surface of the way to preload the bearing assembly and to accurately align the slide relative to the ways.

23 Claims, 10 Drawing Figures

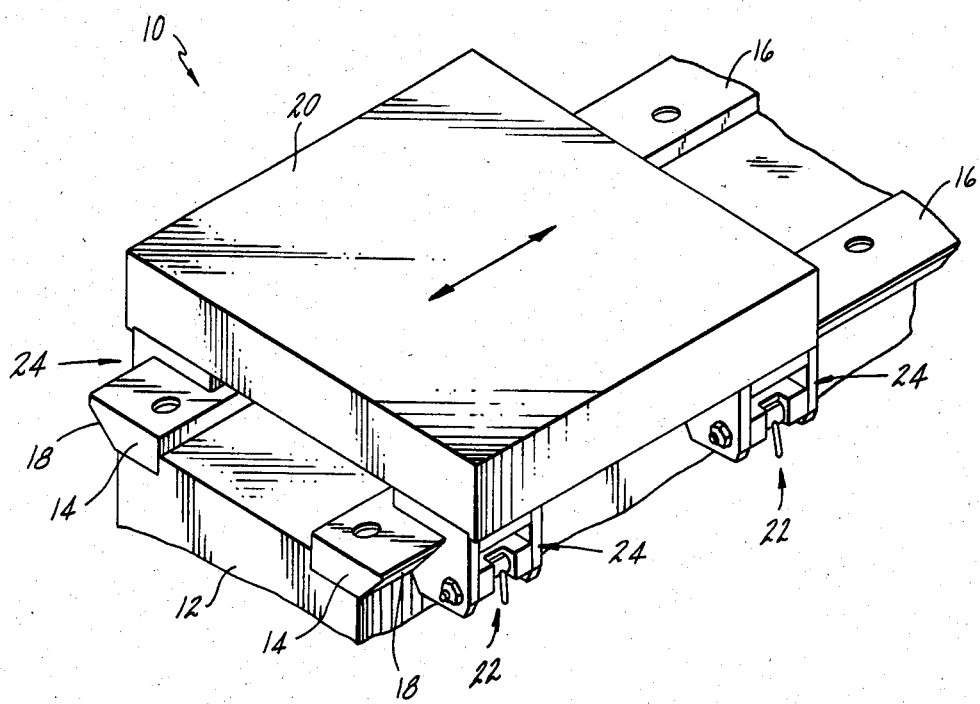
FIG. 1
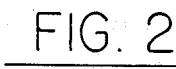
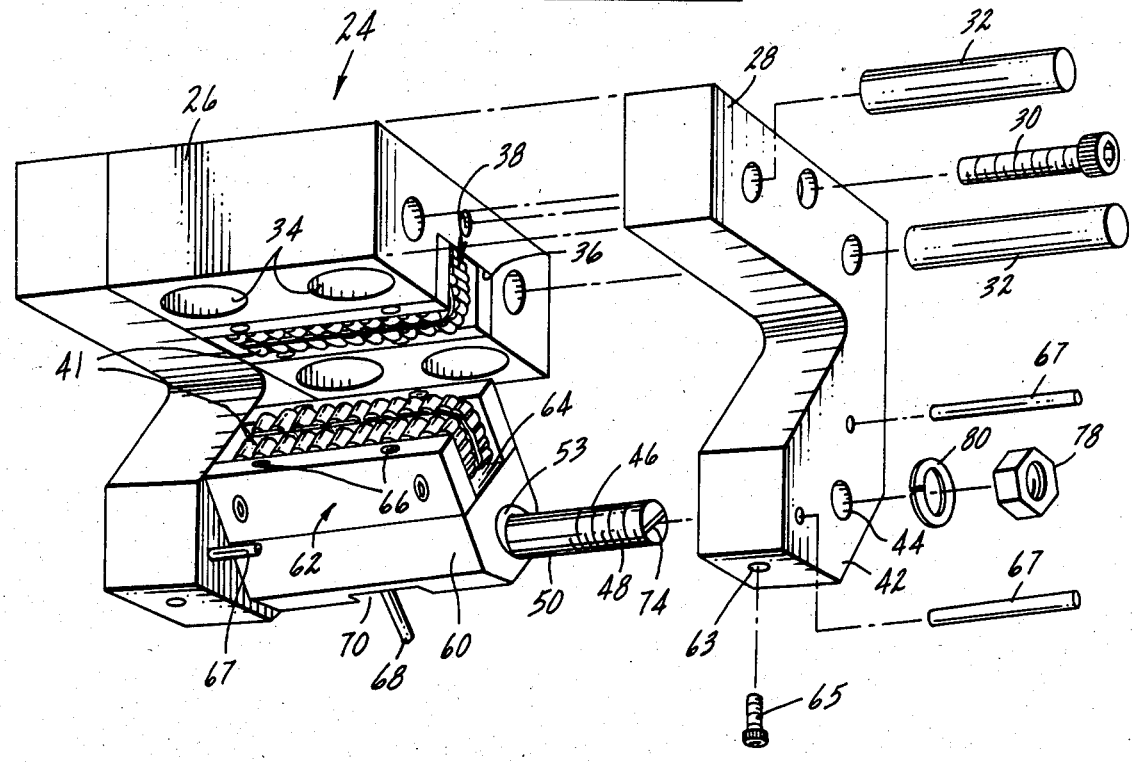

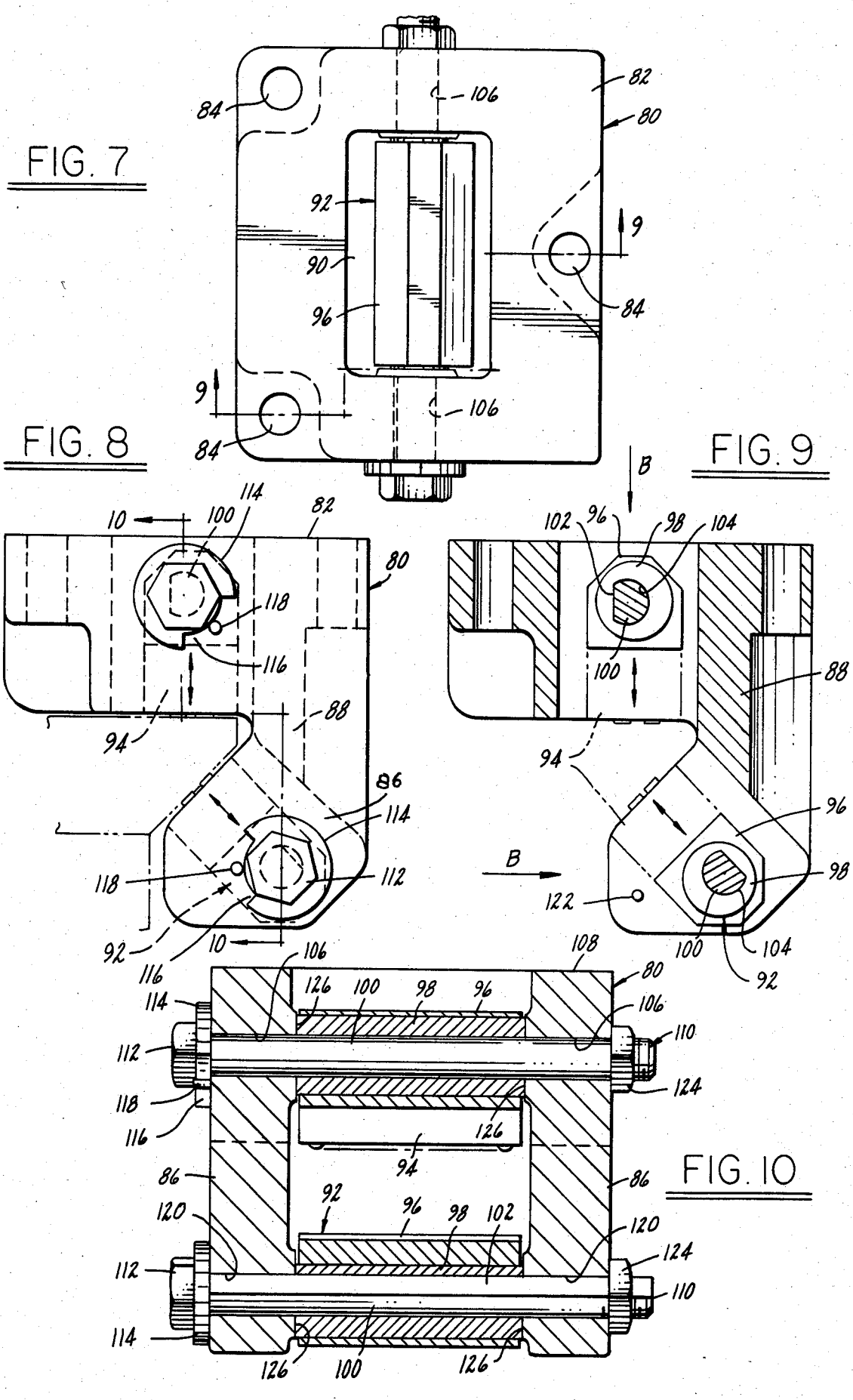

MACHINE SLIDE BEARING ASSEMBLY

FIELD OF THE INVENTION

This invention relates to a bearing assembly for a machine slide and, more specifically, to a bearing arrangement for accurately guiding a slide on a pair of ways.

BACKGROUND AND OBJECTS

Many machines have mounted thereon a pair of ways which serve to guide a slide for movement in a rectilinear path. In some machines roller way bearings are mounted between the guiding surfaces of the ways and the slide for reducing the friction therebetween. The bearings are frequently in the form of recirculatiang linear roller bearing cartridges mounted on the slide and engaging the guide surfaces of the ways. While such arrangements perform satisfactorily on many machines, they frequently are costly, of complicated construction and require specially designed ways. In addition, such bearings do not always perform well in machines where an extremely high degree of accuracy of slide movement is necessary. To obtain an extremely high degree of accuracy of slide movement, preloading and fine adjustment of the bearing cartridges is essential.

The present invention has for its primary object the provision of an anti-friction bearing assembly incorporating a recirculating bearing cartridge adapted to be mounted on a slide in a manner enabling preloading of the bearing to a predetermined safe extent.

Another object of this invention is to provide a bearing assembly of the above type which can be manufactured economically and which is adapted to be used with conventional dovetail or rectangular ways.

A further object of this invention is to provide a bearing assembly of the above type constructed to enable very precise alignment of a slide relative to the ways on which the slide is mounted.

Another object of the present invention is to provide a bearing assembly of the type described which is self-aligning so as to accommodate for deflections resulting from loads applied to the slide on which the bearing assembly is mounted without imposing excessive or localized stresses on the assembly or on the ways of the machine.

Other objects, features and advantages of the present invention will become apparent from the following description and accompanying drawings, in which:

BRIEF DESCRIPTION OF DRAWINGS

FIG. 1 is a fragmentary perspective view of a machine having a slide mounted on dovetail ways by one form of bearing assembly according to the present invention;

FIG. 2 is an exploded perspective view of one of the bearing assemblies;

FIG. 7 is a top plan view of another embodiment of bearing assembly according to the present invention;

FIG. 8 is an end view of the assembly shown in FIG. 7;

FIG. 9 is a sectional view along the line 9—9 in FIG. 7; and

FIG. 10 is a sectional view along the line 10—10 in FIG. 8.

In FIG. 1 there is illustrated a machine 10 having a base 12 on which a pair of accurately parallel dovetail ways 14 are securely mounted. Each way 14 has a top flat guide surface 16 and a downwardly and laterally inwardly inclined flat guide surface 18. A slide 20 is guided for movement lengthwise of ways 14 by means of four bearing assemblies 22, mounted two at each side of the slide adjacent opposite ends thereof. The bearing assemblies 22 at one side of slide 20 are preferably aligned transversely with the bearing assemblies 22 on the opposite side of the slide.

Figure 3:
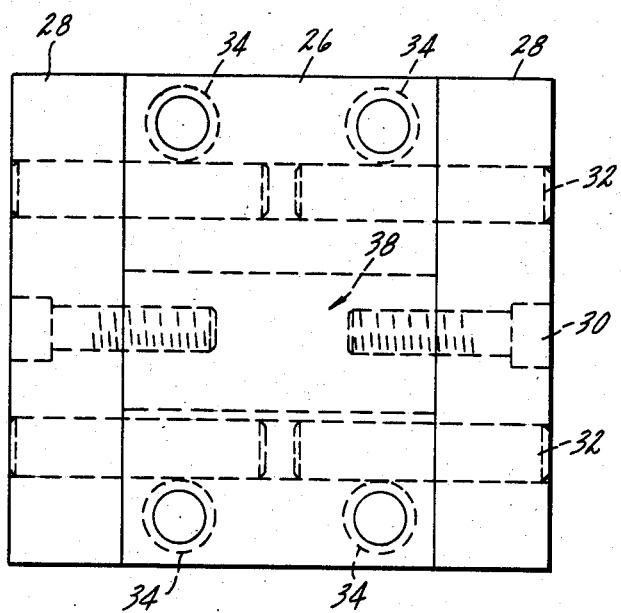
FIG. 3 is a top plan view of the bearing assembly.
Figure 4:
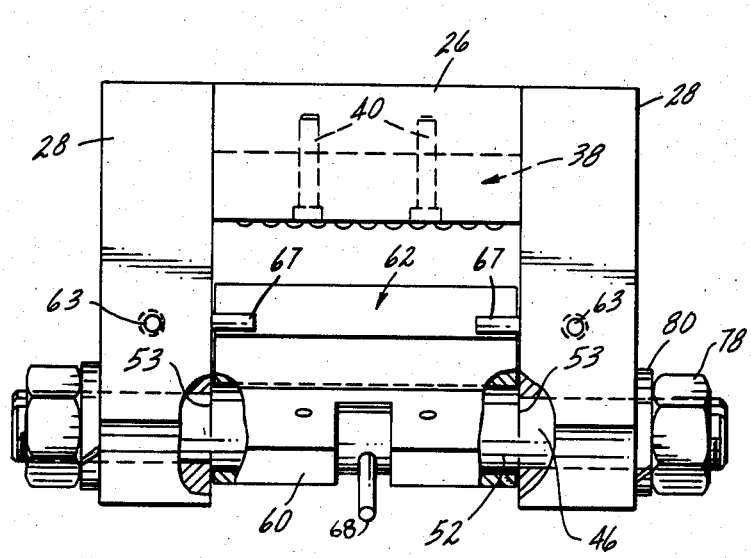
FIG. 4 is an elevational view with parts broken away of the bearing assembly as viewed in the direction of the arrow 4 in FIG. 3.
Figure 5:
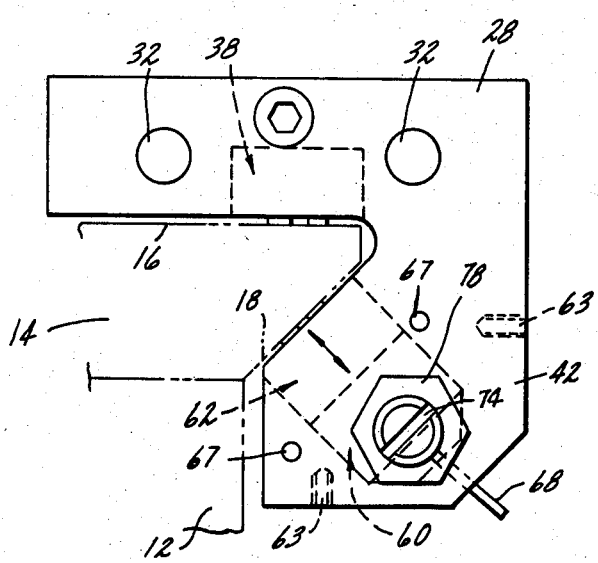
FIG. 5 is an end view of the bearing assembly.

Each bearing assembly 22 comprises a support bracket 24 which, as shown in FIG. 2, includes an accurately machined rectangular top pad 26 having a pair of side plates 28 supported one at each end thereof by screws 30 and dowel pins 32. Top pad 26 has a plurality of openings 34 extending therethrough which are adapted to receive screws (not shown) for fixedly securing the brackets 28 to the underside of slide 20. An accurately machined rectangular slot 36 extends lengthwise in the bottom face of top pad 26. A linear roller bearing cartridge 38 of the recirculating type is mounted within slot 36 by screws 40 (FIG. 4). The roller bearings 41 extending transversely along the bottom face of cartridge 38 form a flat bearing surface accurately perpendicular to the inner opposed faces of side plates 28 and adapted for accurate and smooth rolling engagement with the flat top surfaces 16 of ways 14.

Figure 6:
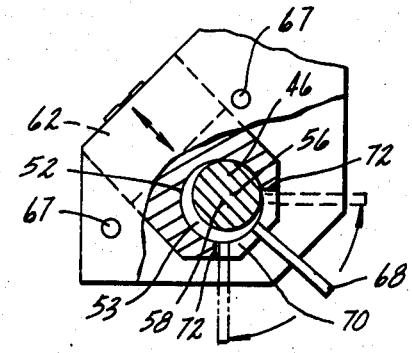
FIG. 6 is a fragmentary end view of the bearing assembly with parts broken away to illustrate the manner in which the bearing cartridges are adjustable.

Each side plate 28 has a depending leg 42. Each leg 42 is formed with an accurately machined bore 44 which, when the side plates 28 are mounted on base 26, are accurately coaxial. Within the two bores 44 there is rotatively supported a hardened shaft 46 threaded at each end as at 48 and having accurately ground cylindrical bearing portions 50 adjacent the threaded ends 48. Bearing portions 50 have a close fit in the bores 44. Shaft 46 has a central accurately ground cylindrical portion 52 which is eccentric relative to the opposite end portions of the shaft. The opposite ends of portion 52 terminate in flat shoulders 53 perpendicular to the axis of shaft 46. The length of eccentric portion 52 corresponds closely with the perpendicular distance between the inner opposed faces of the depending legs 42 of the side plates 28. As shown in FIG. 6, the central axis of shaft 46 is designated 56 and the central axis of the eccentric cylindrical portion 52 is designated 58.

An adjusting block 60 is journalled on the eccentric portion 52 of shaft 46. Another linear roller bearing cartridge 62 of the recirculating type similar to cartridge 38 is mounted on the face 64 of adjusting block 60. Face 64 is accurately parallel to the central axis of the eccentric portion 52 of shaft 46. Cartridge 62 is mounted on face 64 by means of screws 66. The roller bearings 41 extending transversely across the top face of cartridge 62 form a flat bearing surface accurately parallel to the axis of shaft 46 and adapted to engage the inclined guide surfaces 18 of the two ways 14. The length of cartridge 62 and adjusting block 60 is slightly less than the length of the eccentric portion 52 of shaft 46.

If desired, threaded openings 63 can be provided on the side plates 28 where desired to enable mounting dirt shields on the brackets as by screws 65.

The design and construction of each of the above described components of support brackets 24 enable them to be machined and assembled easily and very accurately. The critical faces of the various components can be ground flat and to a highly accurate dimension with little difficulty. Likewise, the various bores can be dimensioned and located very accurately. Therefore, when the components are assembled into a support bracket 24, dimensional tolerances in critical areas can be readily achieved.

It will be appreciated that, before the two side plates 28 are secured to the ends of top pad 26, the assembly of cartridge 62 and adjusting block 60 is arranged on shaft 46 and the opposite ends of the shaft are extended through the bores 44. Pins 67 are mounted in each side plate 28 so as to extend on opposite sides of adjusting block 60 and thus limit the extent to which the assembly of support block 60 and cartridge 62 can be rotated in opposite directions on the eccentric portion 52 of shaft 46. A radially extending pin 68 on the eccentric portion 52 of shaft 46 projects through a cut-out section 70 in the adjusting block. As shown in FIG. 6, shoulders 72 define the arcuate opposite ends of the cut-out section 70 and are engaged by pin 68 to limit the extent to which shaft 46 can be rotated on the support bracket 24.

It will be appreciated that after the four support brackets 24 are mounted on slide 20 in the manner illustrated in FIG. 1, shaft 46 can be rotated in opposite directions to displace the bearing cartridges 62 on each of the support brackets toward and away from the inclined faces 18 of ways 14. For this purpose, the opposite ends of each shaft 46 are preferably slotted as at 74 for engagement with a screwdriver bit on a torque wrench. By reason of the eccentric portion 52 on each shaft 46, each cartridge 62 will be shifted away from the axis of shaft 46 and toward the inclined surface 18 of the associated way when the shaft is rotated in one direction and will be retracted or shifted away from the inclined face 18 of the way and toward the axis of shaft 46 when the shaft is rotated in the opposite direction. The ability to shift the cartridges 62 independently in this manner serves a two-fold function. It enables a desired preload to be applied to the bearing assemblies and also enables the longitudinal center line of the slide 20 to be accurately aligned with respect to the ways 14. For example, if the shafts 46 on the support brackets 24 at one side of slide 20 rotated such that the bearing cartridges thereon are retracted from the inclined face 18 of the associated way and the shafts of the brackets on the opposite side are rotated to drive the bearing cartridges against the inclined faces 18 of the other way, the entire slide would be shifted laterally on the two ways. On the other hand, if the two shafts 46 of the support brackets at one side of the slide are rotated in opposite directions and the shafts on the support bracket at the opposite side of the slide are also rotated in opposite directions, the slide 20 can be rotated slightly in a horizontal plane on the two ways. While the range of this adjustment is small, nevertheless, in a normal assembly this adjustment range can be extremely fine and will make it possible to correct for machining errors.

With respect to the amount of preload applied to the bearing assemblies and the ways, the limited rotational movement of shaft 46 and its arrangement on the support block 60 is very important. In the arrangement illustrated in FIG. 6 the two abutments 72 for the pin 68 are spaced angularly apart about 90° and the pin 68 is secured to the eccentric cylindrical portion 52 such that, when it is in its mid position of arcuate travel as shown in FIG. 6, the axis 56 of shaft 46 and the axis 58 of eccentric portion 52 lie in a plane generally parallel to the plane of the flat bearing surface defined by the roller bearings in cartridge 62. When the pin 68 and the shaft 46 are arranged relative to the abutments 72 as shown in FIG. 6, the shaft is prevented from rotating to a position wherein the axes 56,58 lie in a plane perpendicular to the plane of the bearing surface defined by the rollers of cartridge 62. It is important to prevent the shaft 46 from being rotated to a position approaching this "dead center" position so as to prevent the possibility of generating extremely large forces by the application of relatively low torque to the shafts. This avoids the possibility of accidentally damaging the bearings and/or the ways.

By limiting rotation of shafts 46 in the manner and to the extent indicated in FIG. 6 it has been found that, after the bearings have contacted a way, the preload force varies almost proportionally to the torque applied to the shaft. Thus, if for a particular shaft and bearing assembly this ratio is, for example, 14 to 1, then the operator knows that 50 pounds torque on the shaft will result in a preload force on the bearings of about 700 pounds.

After each of the shafts in the brackets 24 are rotated in one direction or the other to the desired extent to obtain the desired preload and to obtain the proper alignment of the slide on the ways, the shafts may be locked in their adjusted position by tightening nuts 78 on the threaded ends of the shafts against the outer faces of the legs 42 of the side plates with a lock washer 80 therebetween. As pointed out previously, the assembled length of adjusting block 60 and cartridge 62 is slightly less than the length of the eccentric cylindrical portion 52 of shaft 46. Likewise, the length of the eccentric portion 52 corresponds very closely to the distance between the inner faces of side plates 28. Thus, a minimal deflection of the legs 42 of side plates 28 by tightening nuts 78 is sufficient to firmly clamp the inner faces of legs 42 against shoulders 53 and thus lock the shaft 46 against rotation on the bracket 24. However, even though the shaft 46 is locked against rotation, the assembly of adjusting block 60 and cartridge 62 is still permitted to rotate at least slightly on the support bracket 24. This is an important feature of the present invention since it enables the cartridges 62 to become self-aligning with respect to the inclined faces 18 of the ways. Thus, if an excessive transverse or lateral force is applied to the slide 20 (a force sufficient to bend or deflect the legs 42 of a bracket), the cartridge 62 can rotate slightly on the eccentric portion 52 of shaft 46 so as to maintain the rollers therein in flat bearing engagement with the inclined faces 18 of the ways even though the shaft is locked against rotation. If the cartridges 62 were unable to rotate relative to shafts 46, an excessive lateral or transverse force on the slide could result in only one end of the rollers engaging the inclined faces 18 of the ways and, thus, produce excessive localized forces resulting in bearing failure and/or damage to the ways.

In the modified bearing assembly illustrated in FIGS. 7 thru 10 the mounting bracket 80 is manufactured as one piece rather than a three-piece assembly as shown in FIGS. 1 thru 6 and includes a base flange 82 formed with through openings 84 for accommodating screws to mount the assembly on a slide. Bracket 80 includes a pair of spaced-apart depending legs 86, the upper portions of which are interconnected by a transverse web 88. The base flange 82 of bracket 80 is formed with a generally rectangularly shaped through opening 90 for accommodating a bearing assembly 92 which includes a roller way bearing cartridge 94 secured by suitable screws (not illustrated) to an adjusting block 96. As shown in FIGS. 9 and 10, adjusting block 96 is journalled for rotation on a cylindrical bushing 98. Bushing 98 is in turn eccentrically and non-rotatably mounted on a shaft 100. While any suitable means may be employed for non-rotatably mounting bushing 98 on shaft 100, a simple expedient for effecting this connection resides in forming a flat 102 lengthwise on shaft 100 and machining a hole in cylinder 98 which corresponds in cross section with shaft 102. In FIG. 9 the hole in the bushing 98 is designated 104. Shaft 100 is supported in accurately aligned bores 106 in base plate 82. The axis of bores 106 is accurately parallel to the top mounting face 108 of bracket 82. Shaft 100 is in the form of an accurately ground stud threaded at one end as at 110 and having an enlarged non-circular head 112 at its opposite end. Adjacent head 112 there is arranged on the shank of the stud a washer 114 non-rotatably retained thereon by having an opening therein which conforms to the cross sectional shape of shaft 100. Washer 114 is formed with an arcuate slot 116 which extends for about 90° around its periphery. The opposite ends of slot 116 limit the rotation of shaft 100 by abutting against a stop pin 118 in a manner and for the same purpose as the arrangement of pin 68 in arcuate slot 70 in the embodiment illustrated in FIG. 6. This pin and slot arrangement prevents the shaft 100 and the bushing 98 eccentrically mounted thereon from approaching a dead center position. When the shaft 106 is rotated in opposite directions from the position shown in FIGS. 8, 9 and 10 by engaging the head 112 with a turning tool, bearing cartridge 94 is shifted vertically toward and away from the axis of the shaft.

At the lower ends of the depending legs 86 on bracket 80 there is mounted another bearing assembly 92 which, like the bearing assembly previously described, includes a shaft 100, a cylindrical bushing 98 eccentrically mounted thereon, an adjusting block 96 journalled on bushing 98, and a roller way bearing cartridge 94 secured to adjusting block 96. The lower shaft 100 is supported within aligned bores 120 formed adjacent the lower ends of the spaced-apart legs 86. Like the previous embodiment described, a stop pin 122 is mounted on one of the legs 86 to limit rotation of the bearing assembly 92. In all respects adjustment of the lower bearing assembly is substantially the same as the upper bearing assembly as previously described. However, by providing an adjustable upper bearing assembly it will be appreciated that one or both ends of the slide can be raised and lowered relative to the opposite end of the slide or the opposite side of the slide. After the upper bearing assembly is adjusted to the desired position the nut 124 on the threaded end of the shaft can be tightened to retain this position. Thereafter, the lower bearing assembly 92 can be adjusted to obtain the desired preload relative to the way in the manner previously described with reference to FIGS. 1 thru 6 and the nut 124 on the lower shaft can be tightened to retain the associated bearing assembly in a locked position.

It will be observed that the opposed confronting faces on base plate 82 within opening 90 and the inner opposed confronting faces at the lower ends of legs 86 are formed with pads 126. The faces of pads 126 are accurately perpendicular to the axes of shafts 100 and the faces 126 are spaced apart a precise distance. Likewise, it will be observed that the cylindrical bushings 98 are dimensioned in length to have a close fit between pads 126, whereas the adjusting blocks 96 and the cartridges 94 are slightly shorter than bushings 98 so that the bearing cartridges are free to rotate on bushings 98. When the screws 124 are tightened on the threaded ends 110 of shafts 100, the adjacent portions of the bracket can deflect sufficiently to lock the bushings 98 in their adjusted position.

The design of bracket 82 enables the pads 126 to be machined very precisely to the desired dimensions. Thus, as indicated with the previous embodiment described in FIGS. 1 thru 6, the critical faces of the various components of the embodiment shown in FIGS. 7 thru 10 can likewise be machined to very accurate dimensions with little difficulty. The required bores can likewise be dimensioned and located very accurately on the various components of the assembly.

Although the bearing assembly has been shown and described in connection with dovetail ways, it will be readily appreciated that with slight modifications which are obvious the bearing assembly of this invention can also be employed on machine slides used on rectangular ways. In the case of rectangular ways, each bracket 24,80 is designed to support either one or two sets of bearing cartridges, the cartridges in each set being opposed so as to provide two parallel spaced, flat bearing surfaces. One or both cartridges in each set is similarly supported for rotation on the eccentric portions on shafts 46,100. When two sets of cartridges are employed on the same bracket, the four cartridges are perpendicularly related to engage all four guide faces of a rectangular way.

What is claimed is:

1. A bearing assembly for a machine slide mounted for rectilinear movement along ways on the machine, each way having at least one pair of flat guide surfaces, comprising a bracket having a base adapted to be fixedly mounted on the machine slide, a first anti-friction cartridge mounted on said base, means in said cartridge defining a flat bearing surface adapted for engagement with one of the guide surfaces on the ways, said base having a pair of legs depending from opposite ends thereof, said legs having a pair of axially aligned bores therein, the axis of which extends accurately parallel to and offset from the bearing surface of said cartridge, a shaft rotatably supported in said aligned bores, said shaft having a cylindrical portion rotatably fixed thereon between said legs and eccentric to said axis, an adjusting block rotatably supported on the eccentric portion of the shaft, a second anti-friction cartridge fixedly mounted on the adjusting block, means in said last-mentioned cartridge defining a flat bearing surface accurately parallel to said axis and adapted for engagement with the other guide surface on the ways, means for rotating said shaft in opposite directions to retract and extend said last-mentioned cartridge and the bearing surface thereon toward and away from said axis and means for locking said shaft in a rotatively adjusted position on said body, whereby, when the base is mounted on a slide and positioned on the ways with the bearing surface of the first-mentioned cartridge engaging one guide surface of the ways, said shaft is adapted to be rotated to displace the bearing surface of the second cartridge to an extended position in flat bearing engagement with the other guide surface on the ways and thereafter locked to retain the bearing surfaces in engagement with the guide surfaces of the ways.

2. A bearing assembly as called for in claim 1 including means for preventing rotation of said shaft in opposite directions through an angle wherein the axes of the eccentric portion and the shaft lie in a plane generally perpendicular to the bearing surface of the second cartridge.

3. A bearing assembly as called for in claim 1 including means for limiting rotation of the shaft in opposite directions between a fully extended position and a fully retracted position, said limiting means being arranged so that the shaft is prevented from being rotated through an angle wherein the axes of the eccentric portion and the shaft lie in a plane generally perpendicular to the bearing surface of the second cartridge.

4. A bearing assembly as called for in claim 3 wherein said limiting means are arranged such that, when the shaft is rotated to a position generally midway between its fully extended and its fully retracted positions, the axes of said eccentric portion and shaft lie in a plane generally parallel to the plane of the bearing surface of the second cartridge.

5. A bearing assembly as called for in claim 4 wherein said shaft is rotatable from said mid position through an angle of about 45° on opposite sides thereof.

6. A bearing assembly as called for in claim 1 wherein the guide surfaces of the ways have an acute included angle therebetween and including means for limiting rotation of said adjusting block in opposite directions relative to the body through a relatively small extent such that the bearing surface of the second cartridge is normally inclined to the bearing surface of the first cartridge at an acute angle generally corresponding to said inclined angle.

7. A bearing assembly as called for in claim 1 wherein the length of said eccentric portion corresponds closely with the distance between the opposed inner faces of said legs and said locking means comprises means for clamping said legs against the opposite ends of said eccentric portion.

8. A bearing assembly as called for in claim 7 wherein said shaft is threaded at its opposite ends, said clamping means comprising nuts on the ends of the shaft adapted to be tightened against the outer faces of the adjacent legs.

9. A bearing assembly as called for in claim 8 wherein the ends of the shaft are shaped for engagement with a turning tool.

10. A bearing assembly as called for in claim 1 wherein said base is of generally rectangular shape, said legs being rigidly secured to the opposite ends thereof by means of screws, said base having a slot therein extending between the opposite ends thereof, said cartridge being secured in said slot.

11. A bearing assembly as called for in claim 1 wherein said bracket is formed wherein said base and legs are integral.

12. A bearing assembly as called for in claim 11 wherein said cylindrical portion is formed separately from said shaft and is provided with a bore through which the shaft can be inserted and including means interconnecting the shaft and the cylindrical portion for rotatably fixing the cylindrical portion to the shaft.

13. A bearing assembly as called for in claim 12 wherein the opposite ends of the shaft are threaded to receive nuts which, when tightened, clamp the inner faces of said legs against the end faces of said cylindrical portion.

14. A bearing assembly as called for in claim 1 wherein said base is provided with a pair of spaced apart sections having axially aligned bores therein, the axis of which is accurately parallel to the axis of said first-mentioned bores, a second shaft rotatably supported in said last-mentioned bores and having a cylindrical portion rotatably fixed thereon between the confronting opposed face portions of said sections surrounding the ends of said bores, said last-mentioned cylindrical portion being eccentric to the axis of said last-mentioned shaft, an adjusting block rotatably supported on the eccentric portion of the last-mentioned shaft, said first-mentioned cartridge being mounted on the second-mentioned adjusting block and being adjustable toward and away from the second-mentioned axis by rotating the second-mentioned shaft and means for locking said last-mentioned shaft in a rotatably adjusted position.

15. A bearing assembly as called for in claim 14 wherein said spaced apart portions form an opening therebetween which extends through said base.

16. A bearing assembly as called for in claim 15 wherein the free ends of said legs define an opening therebetween, said opening being arranged and oriented that a tool can be extended through the first opening in a direction generally perpendicular to said base and a similar tool can be extended through the second opening in a direction generally perpendicular to the path of movement of the first tool to machine the confronting face portions of the bracket surrounding each pair of aligned bores.

17. A bearing assembly for a machine slide mounted for rectilinear movement along parallel spaced ways on the machine, each way having a pair of spaced flat guide surfaces, comprising a bracket adapted to be fixedly mounted on the slide, a pair of spaced anti-friction bearing cartridges mounted on said bracket, a plurality of rollers in said cartridges defining flat bearing surfaces adapted for engagement, one with each guide surface on a way, the axes of said rollers extending perpendicular to the path of travel of the slide, said bracket having a pair of spaced axially aligned bores thereon, the axis of which extends lengthwise accurately parallel to the path of travel of the slide, a shaft rotatably supported in said bores, said shaft having a cylindrical portion non-rotatably mounted thereon and extending between the confronting ends of said bores, an adjusting block rotatably supported on said cylindrical portion for tilting movement about an axis parallel to the path of travel of the slide, one of said cartridges being mounted on said adjusting block and being displaceable toward and away from the axis of said bores in response to rotation of the shaft in opposite directions, and means for locking the shaft in a rotatively adjusted position.

18. In combination, a machine having a pair of parallel ways, each way having a pair of flat guide surfaces, a slide guided for movement along said ways, said slide having a pair of longitudinally spaced bearing assemblies secured thereto at each side thereof, each bearing assembly comprising a bracket having a base, means rigidly securing each base to said slide, each base having a first bearing cartridge mounted thereon, means in each of said cartridges defining a flat bearing surface in flat engagement with one of the guide surfaces of the ways, said base having a pair of legs depending from opposite ends thereof, said legs being spaced apart lengthwise of the ways, the legs on each bearing assembly having a pair of axially aligned bores therein, the axis of which is accurately parallel to the other guide surface of the ways, a shaft journalled in said bores, said shaft having an eccentric cylindrical portion rotatably fixed thereon and extending axially thereof between said legs, an adjusting block rotatably supported on the eccentric portion of each shaft, a second roller cartridge fixedly mounted on each adjusting block, means in each of said second cartridges defining flat bearing surfaces adapted for flat engagement with the other guide surfaces of the two ways, means for rotating each shaft in opposite directions to retract and extend the bearing face of the associated cartridges toward and away from the axis of the shaft and thereby displace said bearing surfaces into and out of flat bearing contact with the other guide surface of each way and means for locking each shaft in a rotatively adjusted position.

19. The combination set forth in claim 18 wherein the first mentioned guide surface on each way is parallel to the plane of movement of the slide.

20. The combination set forth in claim 18 wherein the bearing assemblies on one side of the slide are aligned transversely with the bearing assemblies on the opposite side of the slide.

21. The combination set forth in claim 20 wherein the shaft on each bearing assembly is rotatively adjustable independently on the shafts of the other bearing assemblies.

22. The combination set forth in claim 18 wherein the ways are of the dovetail type, each having the guide surfaces thereof inclined to one another at an acute angle.

23. The combination set forth in claim 18 wherein said base is provided with a pair of spaced apart sections having axially aligned bores therein, the axis of which is accurately parallel to the axis of said first-mentioned bores, a second shaft rotatably supported in said last-mentioned bores and having a cylindrical portion rotatably fixed thereon between the confronting opposed face portions of said sections surrounding the ends of said bores, said last-mentioned cylindrical portion being eccentric to the axis of said last-mentioned shaft, an adjusting block rotatably supported on the ecentric portion of the last-mentioned shaft, said first-mentioned cartridge being mounted on the second-mentioned adjusting block and being adjustable toward and away from the second-mentioned axis by rotating the second-mentioned shaft and means for locking said last-mentioned shaft in a rotatably adjusted position.

* * * * *